(12) United States Patent
Tomoto

(10) Patent No.: US 7,264,877 B2
(45) Date of Patent: Sep. 4, 2007

(54) SLIDING ELEMENT FOR SEALS AND THEIR PROCESS OF MANUFACTURING

(75) Inventor: Hideki Tomoto, Okayama (JP)

(73) Assignee: Eagle Industry Co., Ltd., Tokyo (JP)

( * ) Notice: Subject to any disclaimer, the term of this patent is extended or adjusted under 35 U.S.C. 154(b) by 271 days.

(21) Appl. No.: 10/757,398

(22) Filed: Jan. 15, 2004

(65) Prior Publication Data

US 2004/0146709 A1 Jul. 29, 2004

(30) Foreign Application Priority Data

Jan. 24, 2003 (JP) .................. 2003-016707

(51) Int. Cl.
*B32B 9/00* (2006.01)
*B32B 17/12* (2006.01)
*C01B 31/00* (2006.01)

(52) U.S. Cl. ............. 428/408; 428/293.4; 260/998.13; 264/29.1

(58) Field of Classification Search ........... 428/544, 428/323, 332, 359, 364, 397, 401, 408, 293.4, 428/698; 423/447.2; 260/998.13; 264/29.1, 264/29.7
See application file for complete search history.

(56) References Cited

U.S. PATENT DOCUMENTS

| | | | | | |
|---|---|---|---|---|---|
| 3,107,153 | A | * | 10/1963 | Boquist | 423/448 |
| 3,932,568 | A | * | 1/1976 | Watts et al. | 264/29.7 |
| 5,080,378 | A | * | 1/1992 | Kagawa | 277/404 |
| 5,538,649 | A | * | 7/1996 | Demendi et al. | 508/101 |
| 5,962,135 | A | * | 10/1999 | Walker et al. | 428/408 |
| 5,990,222 | A | * | 11/1999 | Watada et al. | 524/492 |
| 5,993,905 | A | * | 11/1999 | Sheehan | 427/294 |
| 6,042,935 | A | * | 3/2000 | Krenkel et al. | 428/307.7 |
| 6,248,269 | B1 | * | 6/2001 | Dietrich et al. | 264/29.1 |
| 6,350,520 | B1 | * | 2/2002 | Nesbitt et al. | 428/408 |

* cited by examiner

*Primary Examiner*—N. Edwards
(74) *Attorney, Agent, or Firm*—Arent Fox LLP

(57) ABSTRACT

Sliding element for seals includes 25 to 75 weight % carbonaceous impalpable powdery aggregate of non-graphitizing carbon and/or graphitizing carbon and 20 to 50 weight % synthetic resin as binder. The sliding element is blended with the range of 5 to 25 weight % carbonaceous carbon fibers without surface treatment and inside the carbon matrix, the carbon fibers are randomly scattered.

15 Claims, 7 Drawing Sheets

FACE CONDITION AND WEIGHT DECREASE RATE OF CARBON MATERIAL BY CAVITATION EROSION EVALUATION

DAMAGE FORMS OF SLIDING FACES BY BLISTER RESISTANCE PROPERTY EVALUATION ON MECHANICAL SEAL

SLIDING ELEMENT FOR SEALS AND THEIR PROCESS OF MANUFACTURING

BACKGROUND OF THE INVENTION

1. Field of the Invention

The present invention relates to a sliding element for seals used such as for mechanical seals and to their process of manufacturing. More particularly, the invention relates to a sliding element made from carbon having high degree of hardness which is used for mechanical seals under a heavy load condition, and which reduces the damage caused by cutting wear with floating solid foreign matters in sealed fluid or cavitation erosion of sliding material.

2. Description of the Related Art

Generally, carbon sliding materials are often used as seal rings for mechanical seals to seal the fluid. Between seal sliding faces of the carbon sliding material and that of mating sliding material, when solid foreign matters such as molding sand, solder or cutting powder are tramped, floated and invaded in the sealed fluid from each parts of the system where seals are equipped, the solid foreign matters causes cutting wear on sliding face of the carbon sliding material. This may lead to the damage such as extraordinary surface roughness or extraordinary wear on sliding face and consequently, sealed fluid may leak in cases.

Also, when the mechanical seals are used under a heavy load condition, by sliding, sliding faces are mirror surfaced and become in boundary lubrication condition. Lubrication film between the sliding faces become extremely thin and viscous drag become high, accordingly, Blister effect (surface blister/abrasion) on carbon materials may occur. Also, fluid located to a neighborhood of sliding face may show intense movement and there are cases when neighborhood of mechanical seals become negative pressure and cavitation erosion occur on carbon sliding materials. Consequently seal function may not stably be maintained.

For above mentioned mechanical seal problems, recently, as sliding materials, the combination of silicon carbide sliding materials that show high degree of hardness and excellent wear property may be used.

However, silicon carbide material is poor in self-lubricant property compared to carbon material. Accordingly, by sliding under a heavy load condition, sliding faces become mirror surfaced, fluid film between the sliding faces can not be maintained and become in boundary lubrication, and along with the effect of sliding heat, the sliding faces may be secured to each other and seizure may occur in cases. And due to the sliding heat, secondary seal portion of rubber packing or the like may be damaged and sealed fluid may leak, consequently seal function may not stably be maintained. Further, sliding of the two silicon carbide materials, for solid lubrication can not be expected, if, with any reason, lubrication fluid does not exist in an atmosphere of seal even for a short time, with the sliding heat, the temperature near the sliding face show sudden rise and the same inconvenience occur in cases. At the time of initial running or deactivation of sliding, lubrication film between the sliding faces become thin and sliding torque may inconveniently rise extraordinarily.

SUMMARY OF THE INVENTION

An object of the present invention is to provide a sliding element for seals which has high degree of hardness, excellent wear resistance property and further, solid lubrication property and their process of manufacturing.

In order to achieve the above mentioned object, according to the present invention, provided is a sliding element for seals mainly comprising 25 to 75 weight % carbonaceous impalpable powdery aggregate of non-graphitizing carbon and/or graphitizing carbon and 20 to 50 weight % synthetic resin as binder, wherein carbonaceous carbon fibers without surface treatment are blended within the range of 5 to 25 weight % and inside carbon matrix, said carbon fibers are randomly scattered. In the present invention, "non-graphitizing carbon" and "graphitizing carbon" show degree of difficulty for graphitizing. That is, non-graphitizing carbon have difficulty in graphitizing, to the contrary, graphitizing carbon is easy to graphitize. Non-graphitizing carbon is exemplified by carbon black, polyvinylidene chloride (PVDC) coal, sugar coal, cellulose coal, phenol-formaldehyde resin coal and charcoals. Graphitizing carbon is exemplified by petroleum coke, coal pitch coke, polyvinyl chloride (PVC) coal and 3,5-dimethylphenol formaldehyde resinous coal.

Moreover, according to the present invention, provided is a process of manufacturing sliding element for seals, comprising the steps of blending source material mainly comprising 25 to 75 weight % carbonaceous impalpable powdery aggregate of non-graphitizing carbon and/or graphitizing carbon and 20 to 50 weight % synthetic resin as binder blended with 5 to 25 weight % carbonaceous carbon fibers without surface treatment, mixing, kneading, molding and firing this to a predetermined temperature.

According to the present invention, inside the carbon matrix comprising hard carbonaceous aggregate, carbonaceous hard carbon fibers are randomly scattered and buried for reinforcement. Thus, when floating solid foreign matters in sealed fluid invade between sliding faces of the sliding element and that of mating sliding element, with the effect of reinforced carbon fibers, intense surface roughness on sliding faces by cutting action of solid foreign matters is prevented.

Besides, according to the present invention, the effect of reinforced carbon fibers, for carbon fibers are carbonaceous and shows high degree of hardness, extend to impalpable powdery aggregate of non-graphitizing carbon and/or graphitizing carbon used for entire matrix of carbon material to have high degree of hardness and strength, and prevents these from falling as impalpable powdery condition. Consequently, wear resistance property improves considerably and fine seal property can be maintained, and these are its chief characteristics.

Also, when seal faces are mirror surfaced by sliding and become nearly in boundary lubrication condition, with high viscous drag by high viscosity sealed fluid, Blister effect on sliding faces may occur. However, having carbonaceous aggregate as matrix and reinforced by carbon fibers that are carbonaceous and shows high degree of hardness, sliding element for seals according to the present invention, by high degree of hardness and strength of carbon property plus reinforced carbon fibers, the Blister effect can be avoided.

Likewise, with cavitation erosion that may occur corresponding to the decrease of fluid pressure near the mechanical seal, having carbonaceous aggregate as matrix and reinforced by carbon fibers that are carbonaceous and shows high degree of hardness, sliding element for seals according to the present invention can prevent corrosion of carbon surface by the erosion.

For instance, even soft graphite aggregate comprises carbon matrix which carbonaceous and hard carbon fibers are scattered inside to reinforce or, to the contrary, even hard carbonaceous aggregate comprises carbon matrix which soft graphite carbon fibers are scattered inside, these can not be the countermeasures against contemplate of the present invention like wear property resistance, Blister resistance or cavitation erosion resistance. Persistently, a hard carbonaceous aggregate comprising carbon matrix which carbonaceous and hard carbon fibers are scattered inside to reinforce sliding element for seals is required.

Said carbonaceous aggregate preferably has Vickers hardness of 80 or more.

Further, according to the present invention, for carbon itself has self lubricant property, even it become in vapor-liquid boundary lubrication between the sliding faces, the sliding faces are not secured to each other and seizure does not occur. Likewise, due to the solid lubrication property of carbon, even condition between the sliding faces come to inexistent of fluid lubrication, sliding heat does not suddenly rise and also sliding torque does not rise extraordinarily.

Carbon fibers of the present invention has diameter in a range of from 5 to 30µm and length in a range of from 50 to 300 µm. When the diameter is smaller than this, carbon fibers may break during kneading or molding process and the effect of reinforce inside the carbon matrix may be weakened. When the diameter is larger than this, sliding torque may rise along with heat generation which causes damage on sliding faces and consequently sealed fluid may leak in cases. Then, when the length of carbon fibers are shorter than this, the effect of reinforce inside the carbon matrix may be weakened. When longer, carbon fibers may break during kneading or molding process, scattering property may deteriorate, voids may appear on overlapped portion of carbon fibers inside the carbon matrix and blowholes may appear at angle portion of molded body (sliding element) in cases.

Source materials of carbon fibers can be like PAN (polyacrylonitrile) or pitch series and are not particularly concerned but in order to prevent decrease of hardness, carbon fibers fired at maximum temperature 1500° C. or less is used. When firing temperature is higher than this, carbon fibers may graphitize and carbon fibers itself deteriorates its strength. Accordingly, the effect of reinforce as well as improvement in strength of carbon matrix can not be obtained. Carbon fibers related to the present invention has 200 or more Vickers hardness and belongs to the category of hard carbon. Further, carbon fibers related to the present invention is not surface treated and does not require such process, accordingly lower cost sliding element for seals can be provided.

Source materials of the present invention mainly comprising 25 to 75 weight % impalpable powdery aggregate of non-graphitizing carbon and/or graphitizing carbon and 20 to 50 weight % synthetic resin as binder is blended with the range of 5 to 25 weight % above mentioned carbonaceous carbon fibers without surface treatment.

Concerning the blend ratio of carbon fibers, when it is lower than above mentioned range, the effect of reinforced carbon matrix may be weakened and when higher, scattering property of carbon fibers may deteriorate, voids may appear on overlapped portion of carbon fibers inside the carbon matrix and blowholes may appear at angle portion of molded body (sliding element) in cases.

Concerning the blend ratio of binder, when it is lower than above mentioned range, aggregate and carbon fibers can not completely be coated and it can not completely be filled between the two aggregates, furthermore, fluidity of aggregate during the molding process decreases. To the contrary, when it is higher than above mentioned range, said defects can be resolved but gas composition generated by thermal decomposition of binder during firing process often appears and it gives great effect on deformation or deflation of molded body, further, gas composition may remain in molded body causing cracks on molded body. According to these combination of adequate blend composition, blend ratio of aggregate is determined to be 25 to 75 weight %.

Blending comprising said aggregate, binder and carbon fibers, after the process of mixing and kneading, has carbon fibers randomly scattered inside the kneaded material. Further, after molding process, by firing at temperature of 800 to 1500° C., sliding element for seals according to the present invention which carbon fibers are randomly scattered inside the carbon matrix can be obtained.

As a binder, blended synthetic resin is not particularly concerned of its composition, but during kneading process, it requires sufficient wettability with the surface of aggregate such as non-graphitizing carbon or graphitizing carbon and carbon fibers. During molding process, it also requires sufficient fluidity inside the metal mold. Resins that satisfy these may be synthetic resins such as phenolic resin, epoxy resin, furan resin, polyester resin, and naphthalene resin. One or more kinds from these resins can be picked and used.

The obtained carbon material having high degree of hardness which has aggregate impalpable powdery aggregate of non-graphitizing carbon and/or graphitizing carbon reinforced by carbonaceous carbon fibers having high degree of hardness as matrix, according to the purpose of use, may be added by small amount of mineral additive such as clay or solid lubricant such as graphite aggregate or molybdenum disulfide.

Sliding element for seals according to the present invention is suitably used as mechanical seal for water pump, mechanical seal for compressor of car air conditioner, mechanical seal for pump of industrial use and mechanical seal for pump of all purposes.

EXAMPLES OF THE INVENTION

Figure 1:
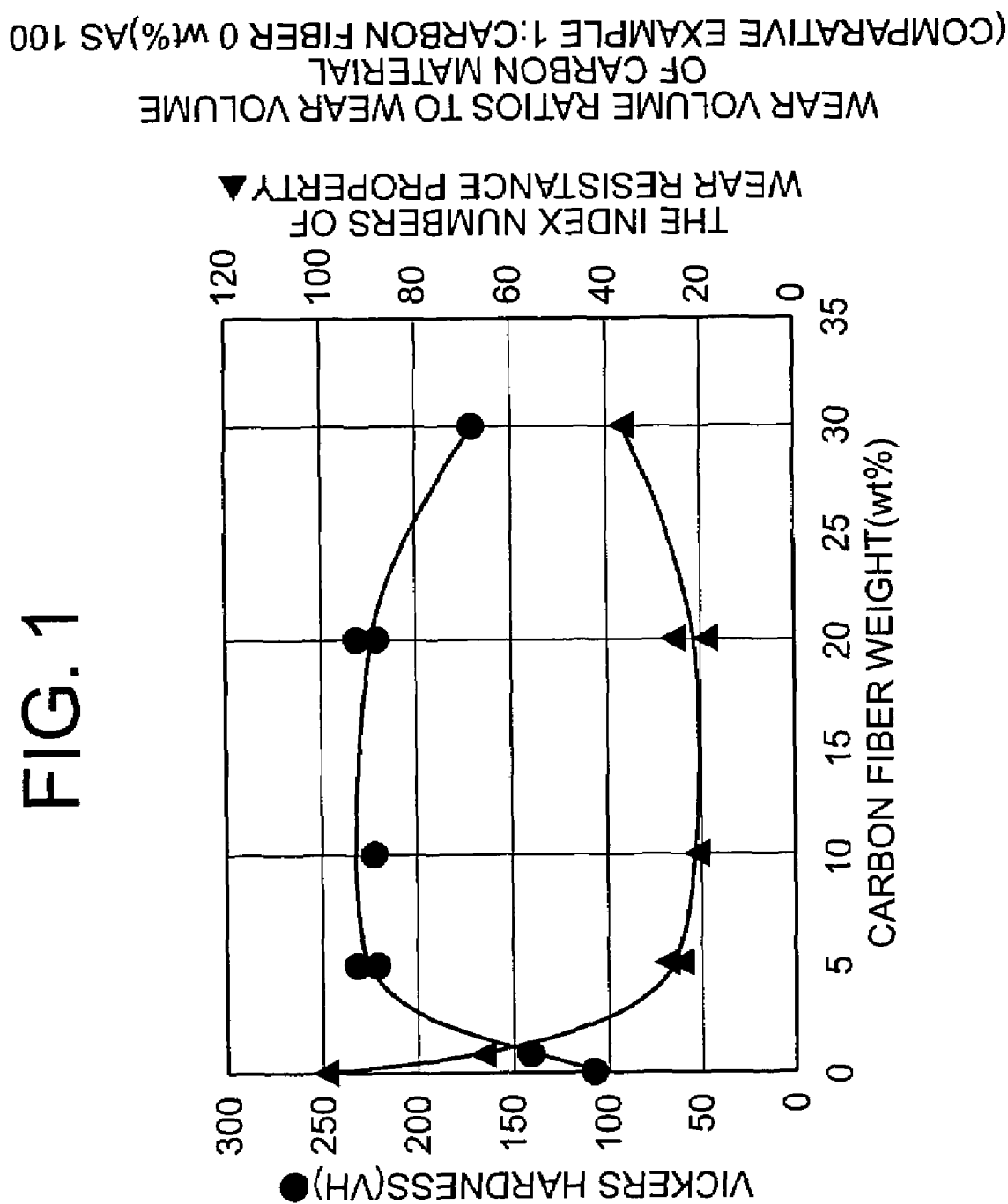
FIG. 1 is a graph showing the relation between amount of carbon fibers and carbon material property according to examples of the invention.

Followings are the examples of the present invention specifically described.

Example 1

69 weight % non-graphitizing carbon (aggregate) and 26 weight % thermosetting phenolic resin(binder) are blended and this is blended with 5 weight % carbon fibers of PAN series having 15 µm diameter and 130 µm length. After each treatment of mixing, kneading, grinding, molding and firing was done to this, seal ring of mechanical seal for sample was produced. Note that carbon fibers of PAN series with 900° C. maximum temperature of heat treatment and 250 Vickers hardness was used.

Vickers hardness (hardness of carbon matrix) and apparent specific gravity of obtained seal ring were measured. Blend ratio of these composition and material characteristics of samples are shown in Table 1.

Example 2

Seal ring was produced under the same condition as example 1 except 65 weight % non-graphitizing carbon and 30 weight % thermosetting phenolic resin were used. Vickers hardness (hardness of carbon matrix) and apparent specific gravity of obtained seal ring were measured. Blend ratio of these composition and material characteristics of samples are shown in Table 1.

Example 3

Seal ring was produced under the same condition as example 1 except 62 weight % non-graphitizing carbon, 28 weight % thermosetting phenolic resin and 10 weight % carbon fibers of PAN series were used. Vickers hardness (hardness of carbon matrix) and apparent specific gravity of obtained seal ring were measured. Blend ratio of these composition and material characteristics of samples are shown in Table 1.

Example 4

Seal ring was produced under the same condition as example 1 except 54 weight % non-graphitizing carbon, 26 weight % thermosetting phenolic resin and 20 weight % carbon fibers of PAN series were used. Vickers hardness (hardness of carbon matrix) and apparent specific gravity of obtained seal ring were measured. Blend ratio of these composition and material characteristics of samples are shown in Table 1.

Example 5

Seal ring was produced under the same condition as example 1 except 50 weight % non-graphitizing carbon, 30 weight % thermosetting phenolic resin and 20 weight % carbon fibers of PAN series were used. Vickers hardness (hardness of carbon matrix) and apparent specific gravity of obtained seal ring were measured. Blend ratio of these composition and material characteristics of samples are shown in Table 1.

Example 6

Seal ring was produced under the same condition as example 3 except graphitizing carbon instead of non-graphitizing carbon was used.

Comparative Example 1

As a comparative example with respect to examples 1 to 5, seal ring was produced under the same condition as example 1 except 72 weight % non-graphitizing carbon and 28 weight % thermosetting phenolic resin were used and carbon fibers were not blended. Vickers hardness (hardness of carbon matrix) and apparent specific gravity of obtained seal ring were measured. Blend ratio of these composition and material characteristics of samples are shown in Table 1.

Comparative Example 2

As a comparative example with respect to examples 1 to 5, seal ring was produced under the same condition as example 1 except 71 weight % non-graphitizing carbon, 28 weight % thermosetting phenolic resin and 1 weight % carbon fibers of PAN series were used. Vickers hardness (hardness of carbon matrix) and apparent specific gravity of obtained seal ring were measured. Blend ratio of these composition and material characteristics of samples are shown in Table 1.

Comparative Example 3

As a comparative example with respect to examples 1 to 5, seal ring was produced under the same condition as example 1 except 42 weight % non-graphitizing carbon, 28 weight % thermosetting phenolic resin and 30 weight % carbon fibers of PAN series were used. Vickers hardness (hardness of carbon matrix) and apparent specific gravity of obtained seal ring were measured. Blend ratio of these composition and material characteristics of samples are shown in Table 1.

TABLE 1

| | sample | | | | | | | |
| --- | --- | --- | --- | --- | --- | --- | --- | --- |
| | Comp. Ex. 1 | Comp. Ex. 2 | Ex. 1 | Ex. 2 | Ex. 3 | Ex. 4 | Ex. 5 | Comp. Ex. 3 |
| non-graphitizing carbon | 72 | 71 | 69 | 65 | 62 | 54 | 50 | 42 |
| phenolic resin | 28 | 28 | 26 | 30 | 28 | 26 | 30 | 28 |
| carbon fibers | 0 | 1 | 5 | 5 | 10 | 20 | 20 | 30 |
| Vickers hardness | 107 | 140 | 220 | 230 | 220 | 220 | 230 | 170 |
| apparent specific gravity | 1.42 | 1.43 | 1.42 | 1.44 | 1.40 | 1.39 | 1.41 | 1.39 |

<Evaluation 1>

Concerning above mentioned examples 1 to 5 and comparative examples 1 to 3, relativity of blend ratio (weight %) of carbon fibers to Vickers hardness is shown in FIG. 1. As shown in the same figure, by the blend of carbon fibers and by the increase in blend ratio, Vickers hardness rises. But by further increase in blend ratio of carbon fibers, Vickers hardness falls. As a result, optimum blend ratio of carbon fibers are 5 to 20 weight % and with this ratio, Vickers hardness is high and it is preferable for wear resistance property. Further, for seal ring, preferable Vickers hardness is 200 or more so that optimum blend ratio of carbon fibers are 5 to 25 weight % as is shown in the same figure.

Figure 2:
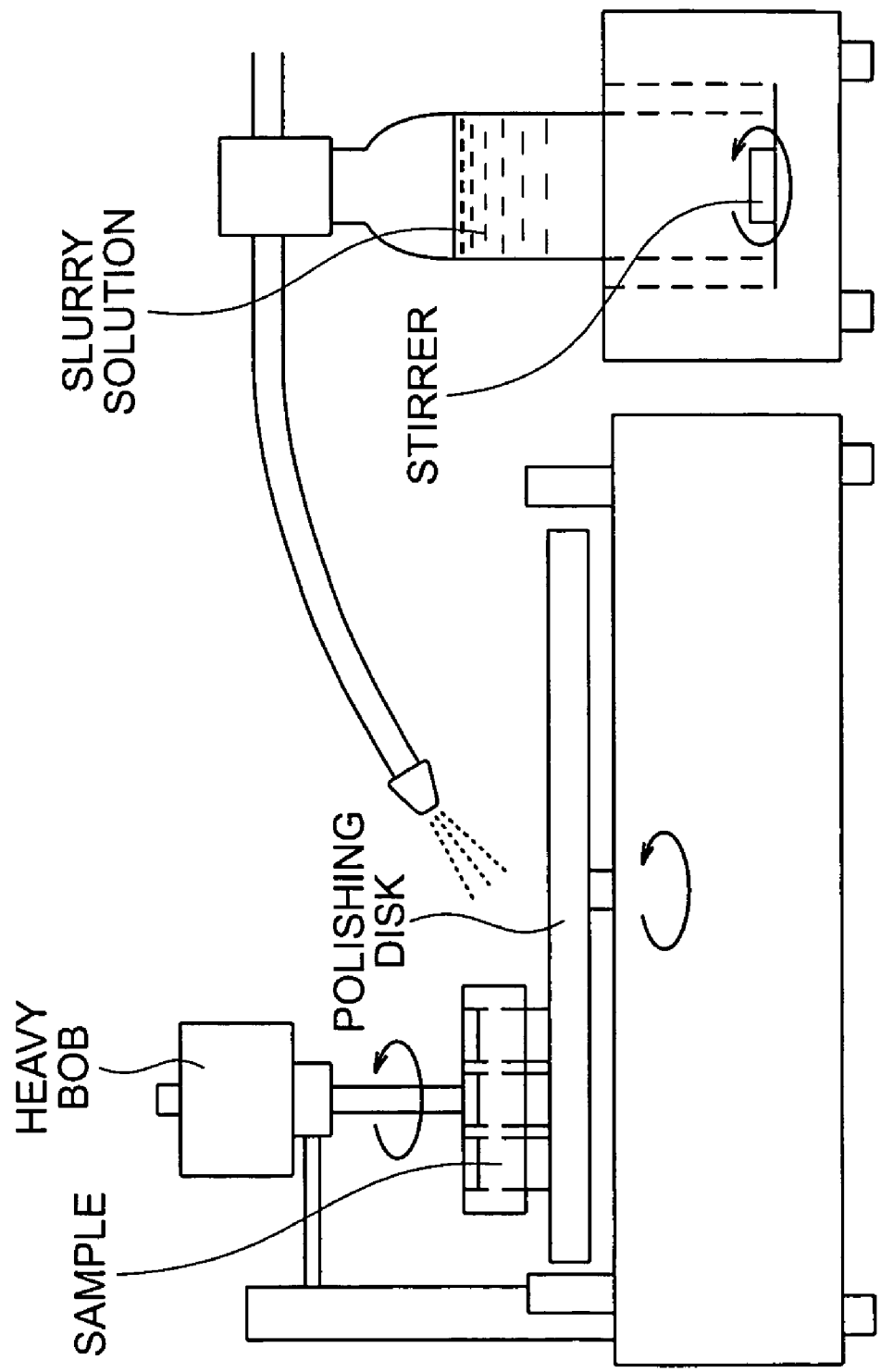
FIG. 2 is a figure showing a testing machine of wear resistance by foreign material used in examples of the invention.

Also, concerning above mentioned examples 1 to 5 and comparative examples 1 to 3, resistance to wear by foreign material was evaluated. This evaluation of resistance to wear by foreign material was done as stated below. 0.5 weight % Dust for Industrial Testing No. 8 of JIS Z 8901 "test powders and test particles" and 0.5 weight % alumina powder (67 μm average particle size) are scattered in ion-exchange water and this slurry solution, at 30-second intervals by 1 g, was sprayed to polishing wheel of automatic polishing testing machine shown in FIG. 2. At automatic polishing testing machine shown in the same figure, polishing wheel revolve at 165 min$^{-1}$, on the polishing wheel, carbon material (sample) for evaluation is placed, 20N heavy bob was loaded and the sample rotate and slide on the polishing wheel. Therefore, due to the slurry solution which exist among differential gap between the sample and the polishing wheel, wearing of the sample can be evaluated. Evaluation time was 15 minutes and before and after the evaluation, sample weight was weighed. The weight difference was converted to volume and treated as wear quantity. Now the evaluation was done as follows. Relative ratio of sample wear quantity to reference carbon material blend ratio of carbon fibers are zero as in comparative example 1) wear quantity was obtained and decided as index number of wear resistance property.

When this evaluation of resistance to wear by foreign material was actually done under above mentioned condition, as shown in FIG. 1, as the blend of carbon fibers increase, wear volume fraction decreases and wear resistance property improves. As the blend of carbon fibers further increases, wear volume fraction increases and wear resistance property decreases. As a result, optimum blend ratio of carbon fibers are recognized as 5 to 20 weight %.

<Evaluation 2>

Wear resistance property of carbon material related to the present invention was relatively evaluated from that of other materials and its position was confirmed by said evaluation of resistance to wear by foreign material.

As evaluation samples, example 3 of table 1 and existing carbon material A and B of conventional carbon material with good market performance are used. Further, as other materials, silicon carbide A by normal pressure sintering, silicon carbide B by reaction sintering, and silicon carbide C and D with remained carbon are used. Vickers hardness and apparent specific gravity of these carbon materials A and B and silicon carbide A to D are shown in table 2. Relativity of wear volume fraction to Vickers hardness is shown in FIG. 3.

TABLE 2

| | sample | | | | | |
|---|---|---|---|---|---|---|
| | carbon A | carbon B | silicon carbide A | silicon carbide B | silicon carbide C | silicon carbide D |
| Vickers hardness | 107 | 73 | 2200 | 1400 | 870 | 200 |
| apparent specific gravity | 1.55 | 1.60 | 3.04 | 3.05 | 2.60 | 2.30 |

Figure 3:
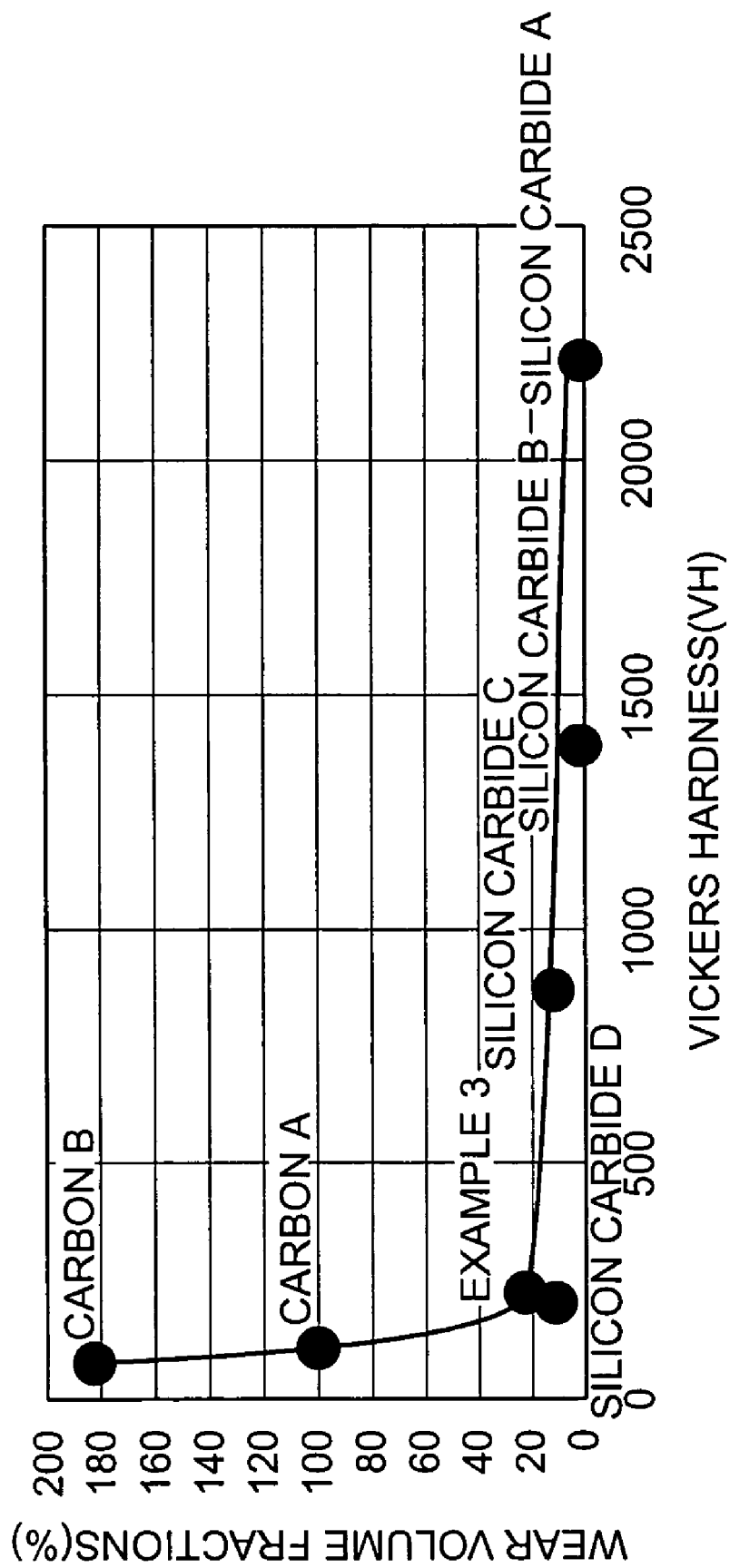
FIG. 3 is a graph showing the relation between Vickers hardness and wear volume fraction according to examples of the invention.

As is shown in FIG. 3, silicon carbide with high Vickers hardness have low wear volume fractions. When Vickers hardness is higher than 200, wear volume fractions are small but as Vickers hardness decreases lower than 200, the tendency of increase in wear volume fractions can be observed. That is, for wear resistance property of this evaluation condition, materials having high degree of hardness such as silicon carbide are not required. Materials with 200 or more Vickers hardness are well contented for wear resistance property.

<Evaluation 3>

Figure 4:
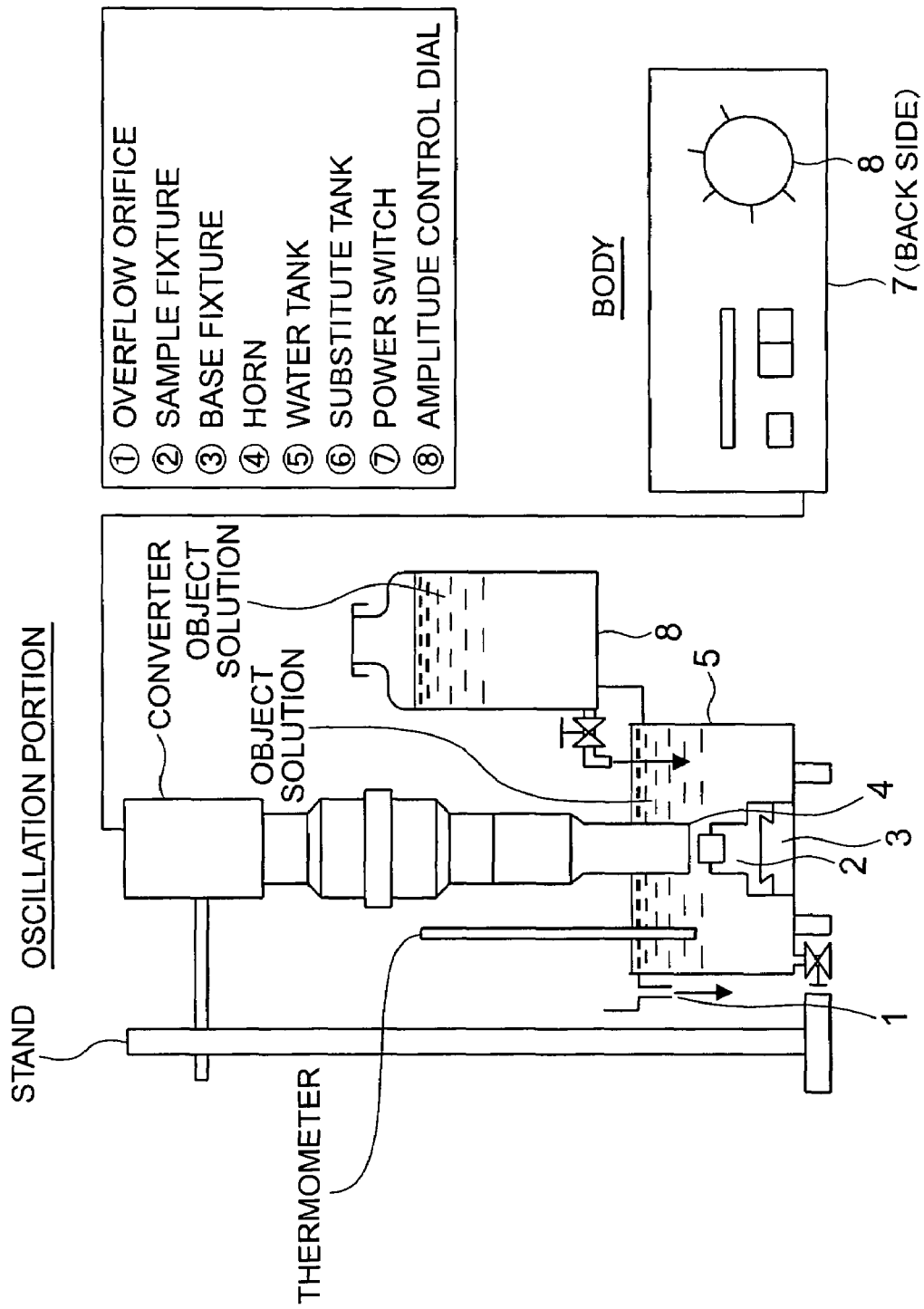
FIG. 4 is a figure showing a evaluation testing machine for cavitation erosion used in examples of the invention.

As an evaluation for cavitation erosion, by using ultrasonic homogenizer shown in FIG. 4 and keeping 25 to 30° C. water temperature in ion-exchange water, horn was vibrated at 80 μm amplitude and 20 kHz frequency and ultrasonic wave was irradiated to sample. After 10 minutes of this testing time, weight decreased amount was measured and evaluated. As evaluation samples, example 3 of table 1 and carbon material A and carbon material B of table 2 were used. The measured ratios of weight decrease and electron microscope photographs of evaluated samples are shown in FIG. 5.

Figure 5:
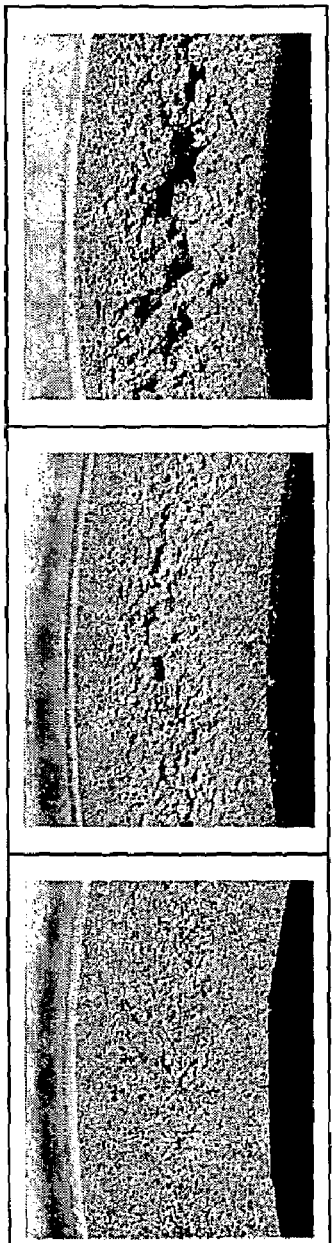
FIG. 5 is a figure showing ratios of weight decrease and sample forms after the evaluation.

As shown in FIG. 5, carbon fibers blended hard carbon material of example 3 has lower ratio of weight decrease relatively to those of conventional existing carbon material A or carbon material B. And under this evaluation condition, it can be said that this has erosion resistance property.

<Evaluation 4>

As evaluation of resistance to wear by foreign material according to mechanical seal sliding, actual testing machine that simulates water pump was used. Then in 50% aqueous solution of long life coolant (LLC), 3 weight % Dust for Industrial Testing No. 3 of JIS Z 8901 "test powders and test particles", 3 weight % Dust for Industrial Testing No. 8 of those and 3 weight % 100 to 200 μm molding sand were put, maintained at 90° C. and by keeping 0.1 MPa sealed pressure, seal property was evaluated for 50 hours at 8000 min$^{-1}$ rotary speed. As evaluation result, total amount of leakage and preform of sliding faces after the evaluation were measured. These are shown in FIG. 6.

As evaluation samples, example 3 of table 1 and carbon material A, carbon material B and silicon carbide A of table 2 were used for seal ring of mechanical seals for water pump. And as mating ring of mating sliding material, silicon carbide A was used.

Figure 6:
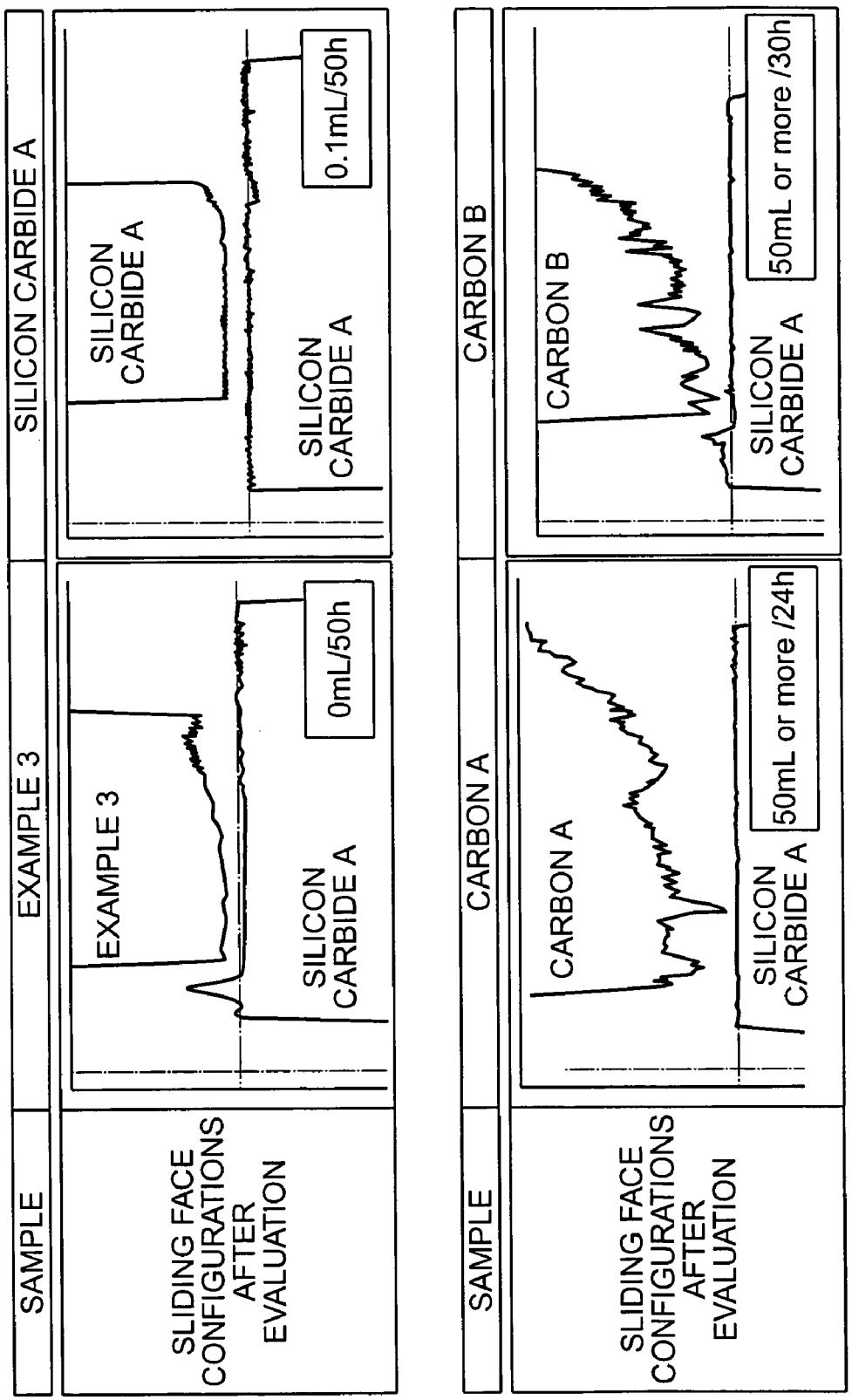
FIG. 6 is a figure showing amount of leakage and form of sample sliding faces after the evaluation.

As shown in FIG. 6, though carbon fibers blended hard carbon material of example 3 is little inferior to silicon carbide A in wear resistance property, extreme wear or extreme leakage do not occur like conventional existing carbon material A or carbon material B. Accordingly, resistance to wear by foreign material and seal property as mechanical seal are well contented for their functions.

<Evaluation 5>

As evaluation of resistance to Blister property according to mechanical seal sliding, actual testing machine that simulates compressor for car air conditioner was used. Then after compressor oil was applied on seal ring sliding face, by keeping 5 MPa pressure by nitrogen gas, 0 $min^{-1}$ to 3600 $min^{-1}$ rotary speed was repeated 15 times by a minute cycle. As evaluation result, sliding face condition after the evaluation was observed and is shown in FIG. 7.

As evaluation samples, example 3 of table 1 and carbon material A of table 2 were used for seal ring of mechanical seals for compressor of car air conditioner. And as mating ring of mating sliding material, silicon carbide A was used.

Figure 7:
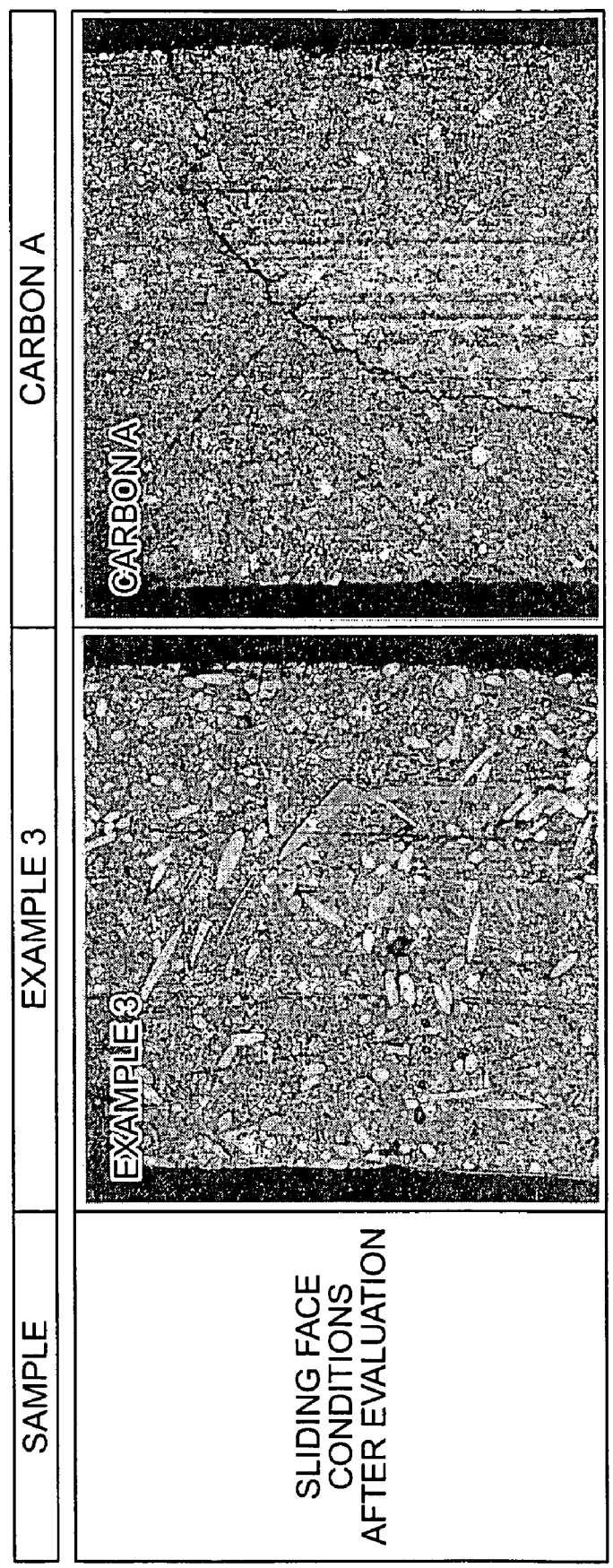
FIG. 7 is a figure showing configuration of sample sliding faces after the evaluation.

As shown in FIG. 7, Blister occurred on conventional existing carbon material A, to the contrary, Blister did not occur on carbon fibers blended hard carbon material of example 3. And under this evaluation condition, it can be said that this is well contented for Blister resistance property.

Concerning said example 6, in the respect of all the above mentioned evaluationes, the similar result with example 3 was obtained.

The effect of the invention is as follows.

According to the present invention, sliding element for seals which has high degree of hardness, excellent wear resistance property and further, solid lubrication property and their process of manufacturing can be produced.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A sliding element for seals comprising:
   a fired preformed material including,
   a binder having 25 to 75 weight % carbonaceous impalpable powdery aggregate of non-graphitizing carbon and/or graphitizing carbon and 20 to 50 weight % synthetic resin,
   wherein the binder is blended with a carbon matrix having carbonaceous carbon fibers free of surface treatment in a range of 5 to 25 weight %,
   wherein said carbonaceous carbon fibers are randomly scattered in the carbon matrix, and
   wherein said carbonaceous carbon fibers are 5 to 30 μm in diameter, 50 to 300 μm in length, and have a Vickers hardness of at least 200.

2. The sliding element for seals according to claim 1, wherein a Vickers hardness of said carbonaceous impalpable powdery aggregate of non-graphitizing carbon and/or graphitizing carbon is 80 or more.

3. The sliding element for seals according to claim 1, wherein said synthetic resin includes at least one of phenolic resin, epoxy resin, furan resin, polyester resin, and naphthalene resin.

4. The sliding element for seals according to claim 2, wherein said synthetic resin includes at least one of phenolic resin, epoxy resin, furan resin, polyester resin, and naphthalene resin.

5. The sliding element for seals according to claim 1, wherein the sliding element for seals is used as one of a mechanical seal for a water pump, a mechanical seal for a compressor of a car air conditioner, a mechanical seal for a pump of industrial use and a mechanical seal for a pump of all purposes.

6. The sliding element for seals according to claim 2, wherein the sliding element for seals is used as one of a mechanical seal for a water pump, a mechanical seal for a compressor of a car air conditioner, a mechanical seal for a pump of industrial use and a mechanical seal for a pump of all purposes.

7. The sliding element for seals according to claim 3, wherein the sliding element for seals is used as one of a mechanical seal for a water pump, a mechanical seal for a compressor of a car air conditioner, a mechanical seal for a pump of industrial use and a mechanical seal for a pump of all purposes.

8. A seal assembly comprising a sliding element according to claim 1 and a mating sliding element comprised of a material having a Vickers hardness greater than that of the sliding element of claim 1.

9. The seal assembly according to claim 8, wherein the mating sliding element is comprised of silicon carbide.

10. A process of manufacturing a sliding element for seals, comprising the steps of:
    blending a source material binder comprising 25 to 75 weight % carbonaceous impalpable powdery aggregate of non-graphitizing carbon and/or graphitizing carbon and 20 to 50 weight % synthetic resin with 5 to 25 weight % carbonaceous carbon fibers that are free of surface treatment;
    mixing, kneading and molding the blended material to a preform; and
    firing the preform at a predetermined temperature,
    wherein said carbonaceous carbon fibers are 5 to 30 μm in diameter, 50 to 300 μm in length, and have a Vickers hardness of at least 200.

11. The process of manufacturing a sliding element for seals according to claim 10, wherein said synthetic resin includes at least one of phenolic resin, epoxy resin, furan resin, polyester resin, and naphthalene resin, and wherein a firing temperature for said firing is 800 to 1500° C.

12. The sliding element for seals according to claim 1, wherein said carbonaceous carbon fibers are manufactured from one of polyacrylonitrile series carbon fibers and pitch series carbon fibers.

13. The sliding element for seals according to claim 1, wherein said carbonaceous carbon fibers withstand a maximum heat treatment temperature of 1500° C.

14. The process of manufacturing a sliding element for seals according to claim 10, wherein said carbonaceous eaton fibers are manufactured from one of polyacrylonitrile series carbon fibers and pitch series carbon fibers.

15. The process of manufacturing a sliding element for seals according to claim 10, wherein said carbonaceous carbon fibers withstand a maximum heat treatment temperature of 1500° C.

* * * * *